United States Patent [19]
Schrott et al.

[11] Patent Number: 4,719,170
[45] Date of Patent: Jan. 12, 1988

[54] OPTICAL RECORDING MATERIAL

[75] Inventors: Wolfgang Schrott, Ludwigshafen; Peter Neumann, Wiesloch, both of Fed. Rep. of Germany

[73] Assignee: BASF Aktiengesellschaft, Ludwigshafen, Fed. Rep. of Germany

[21] Appl. No.: 833,259

[22] Filed: Feb. 27, 1986

[30] Foreign Application Priority Data

Mar. 2, 1985 [DE] Fed. Rep. of Germany ....... 3507379

[51] Int. Cl.$^4$ .................. B32B 9/04; G03C 1/495; G01D 15/10; G01D 9/00
[52] U.S. Cl. .................... 430/270; 430/945; 346/76 L; 346/135.1; 428/411.1
[58] Field of Search ............ 430/270, 271, 945; 346/76 L, 135.1, 137.1; 428/411.1

[56] References Cited

U.S. PATENT DOCUMENTS

| 4,219,826 | 8/1980 | Bloom et al. ............ | 346/135.1 |
| 4,222,902 | 9/1980 | Huffman et al. .......... | 252/500 |
| 4,241,355 | 12/1980 | Bloom et al. ............ | 346/135.1 |
| 4,298,975 | 11/1981 | van der Veen et al. ..... | 369/94 |
| 4,320,489 | 3/1982 | Crandall et al. ......... | 369/111 |
| 4,458,004 | 7/1984 | Tanikawa ................ | 430/270 |
| 4,508,811 | 4/1985 | Gravesteijn et al. ...... | 430/270 |
| 4,585,722 | 4/1986 | Morinaka et al. ......... | 430/201 |

FOREIGN PATENT DOCUMENTS 0083991 7/1983 European Pat. Off. .
0084729 8/1983 European Pat. Off. .
1577968 10/1980 United Kingdom .
2066490 7/1981 United Kingdom .

OTHER PUBLICATIONS

Semiconductive Composition w polymeric binder, organic dye, Huffman et al., CA:86:131105m, p. 59, 1977.

Primary Examiner—John E. Kittle
Assistant Examiner—Patrick J. Ryan
Attorney, Agent, or Firm—Oblon, Fisher, Spivak, McClelland & Maier

[57] ABSTRACT

The novel recording materials contain triquinocyclopropanes of the formula (I)

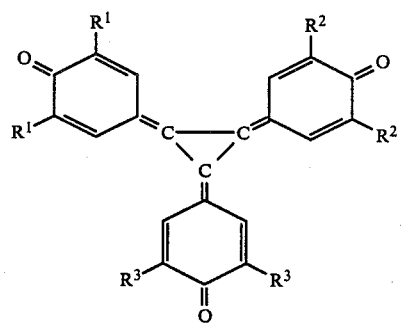

where $R^1$, $R^2$ and $R^3$ independently of one another are each $C_1$–$C_{12}$-alkyl, in a polymer layer, and can be written on and read by means of a semiconductor laser. The information written has a high signal-to-noise ratio.

11 Claims, No Drawings

OPTICAL RECORDING MATERIAL

Recording materials in which radiation having a high energy density, eg. laser light, produces a localized change of state are known. This thermally produced change of state, for example vaporization, change in flow behavior or fading, is associated with a change in the optical properties, for example in the absorption as a result of a change in the absorption maximum, or in the extinction, and this change can be utilized for recording information or data.

Because of the small size of the element, its low energy demand and the possibility of direct modulation of the optical output power by modulating the electric driving current, solid state injection lasers which emit in the near infrared, especially the AlGaAs laser, which operates in the wavelength range from about 750 to 950 nm, are particularly useful as a light source for an optical recording system.

A large number of inorganic and organic materials are known for this application. These materials have an adeqate absorption in this wavelength range and alter their optical properties by absorbing the radiation and hence the energy present therein in the stated wavelength range, by disintegration, vaporization, melting or in another manner.

The known information recording materials consist of a base on which thin layers of inorganic materials, eg. metals, semimetals, alloys of chalcogen glass, or organic compounds, such as IR dyes, are applied. The thin layers are produced, in particular, by vapor deposition under reduced pressure or by atomization techniques. The thickness of the layers should be chosen so that the total incident radiation is absorbed, unless it is intended to utilize interference phenomena. The base can consist of glass or of a suitable plastic, eg. a polycarbonate, polymethylmethacrylate, polystyrene, a polystyrene copolymer, polyvinyl chloride or polymethylpentene.

When used as a storage material, the amorphous layers must remain unchanged over prolonged periods.

Aging processes, eg. crystallization or fading due to light and heat, which alter the morphology of the storage layer take place relatively frequently in thin layers produced by vapor deposition. Neutral IR dyes in polymer films, ionic IR dyes in the form of lakes or IR chromophores chemically bonded to polymers should be more stable over prolonged periods. Moreover, the latter have the advantage that they can be prepared by a more economical process.

A large number of bases, reflective materials and laser light-sensitive layers for optical recording materials for use with semiconductor injection lasers are known. Organic IR dyes which have been described are various substituted phthalocyanines which contain different central metal atoms and are processed to laser light-sensitive layers either by vapor deposition or by spin coating (dye-in-polymers) (U.S. Pat. Nos. 4,458,004 and 4,241,355, EP-A Nos. 13 453, 83 991 and 84 729 and Japanese Preliminary Published Application Nos. 067 093/1984, 082 095/1982 and 082 096/1982).

Dithiolene complexes possessing various substituents and central metal atoms, in particular nickel, palladium and platinum, have also been used in layers produced by vapor deposition or in polymer layers (dye-in-polymer) for optical data stores (U.S. Pat. No. 4,320,489 and German Laid-Open Application Nos. DOS 2,951,341, DOS 3,319,738 and DOS 3,032,135).

According to Japanese Preliminary Published Application No. 11 385/1984, it is also possible to use, in particular, the charged 2:1 complexes with chromium and cobalt as central atoms, these complexes having an absorption maximum in the wavelength range from 700 to 900 nm and being used in binders.

Anthraquinone dyes, triphenylmethane dyes and pyrylium and thiopyrylium salts for use in optical recording materials have also been described.

Methine dyes, too, have been used in optical recording materialS. Individual dyes which are particularly important for this purpose are those whose methine chain is stabilized by five-membered or six-membered rings capable of conjugation. Quadratic acid derivatives have also been used in optical recording materials (EP-A No. 116 381 and Japanese Preliminary Published Application Nos. 112 792/1983 and 220 143/1983).

DE-A Nos. 2 609 149 and 2 707 086 discloses cyclopropane compounds of the formula

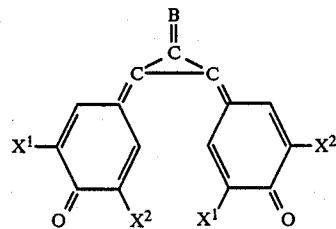

where B is =O or

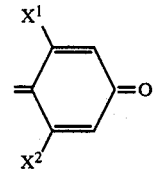

and $X^1$ and $X^2$ are each hydrogen, chlorine, bromine, iodine, amino, carboxyl, carbamyl, carbonylamino or unsubstituted or halogen-substituted alkyl, or are each alkoxy, or are each phenyl which is unsubstituted or substituted by halogen, alkyl or alkoxy, or are each phenoxy. According to the literature cited, the cyclopropane compounds are used as sensitizers in semiconducting materials and electrophotographic layers.

It is an object of the present invention to provide further dyes which have a high absorption in the near infrared range and are readily soluble in polymeric binders and accordingly are suitable for optical recording materials.

We have found that this object is achieved and that, among the soluble non-ionic dyes, the triquinocyclopropanes of the formula

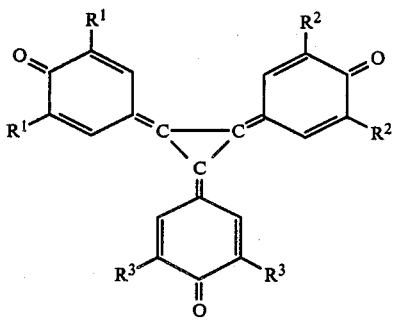

where $R^1$, $R^2$ and $R^3$ independently of one another are each straight-chain or branched $C_1-C_{12}$-alkyl, are particularly useful for optical recording materials. The present invention accordingly relates to recording materials consisting of a base and a dye-containing polymer layer, wherein the polymer layer contains one or more triquinocyclopropanes of the formula (I), where $R^1$, $R^2$ and $R^3$ have the above meanings.

The dyes used in the light-absorbing layer of the recording materials according to the invention exhibit strong absorption at the wavelength of the semiconductor lasers, from about 700 to 950 nm. The layer can be applied onto a light-reflecting layer so that smooth absorption layers of optical quality are obtained.

The novel recording materials can be written on or read using a semiconductor laser. Because of the high light absorption of the dyes, the novel recording materials are very sensitive to the light of the semiconductor laser.

In order to use lasers which emit in other wavelength ranges, mixtures with dyes from the above classes of substances (substituted phthalocyanines, substituted dithiolene complexes, azo dyes, anthraquinone dyes, triphenylmethane dyes, methine dyes, quadratic acid derivatives and pyrylium and thiopyrylium salts) can be used. Into these layers, information can be written with a high signal-to-noise ratio.

Suitable dyes (1) are those in which $R^1$, $R^2$ and $R^3$ are each $C_1-C_{12}$-alkyl.

Specific examples of $R^1$, $R^2$ and $R^3$ are methyl, ethyl, n- and isopropyl, n- and isobutyl, 2-butyl, tert-butyl, amyl, n-hexyl, n-octyl, 2-ethylhexyl, decyl, nonyl and dodecyl.

$R^1$, $R^2$ and $R^3$ are each preferably $C_1-C_4$-alkyl, in particular methyl, isopropyl and/or tert-butyl, noteworthy dyes being those in which one or more of the radicals $R^1$, $R^2$ and $R^3$ are isopropyl or tert-butyl.

Particularly preferred dyes of the formula (I) are those in which $R^1$, $R^2$ and $R^3$ have the meanings stated in the Table.

| Dye | $R^1$ | $R^2$ | $R^3$ | $\lambda_{max}$ | $(\log \epsilon)^1$ |
|---|---|---|---|---|---|
| I. 1 | i-Pr | i-Pr | i-Pr | 776 | (4.66) |
| I. 2 | t-Bu | t-Bu | t-Bu | 769 | (4.71) |
| I. 3 | Me | t-Bu | t-Bu | 768 | (4.67) |
| I. 4 | i-Pr | t-Bu | t-Bu | 772 | (4.67) |
| I. 5 | i-Pr | i-Pr | t-Bu | 770 | (4.70) |

[1]R. West and D. C. Zecher, J.A.C.S. 92 (1970), page 158.

The dyes used in the novel recording materials are known (cf. R. West et al., J. Amer. Chem. Soc. 92 (1970), 155-161, and the literature cited therein). These compounds are readily soluble in non-polar solvents.

The structure of the recording materials is known per se.

A reflecting layer may be present between the light-absorbing layer and the base, so that the incident light which passes through the colored layer (provided that it is not absorbed) is reflected at the reflector layer and again passes through the colored layer.

Exposure may also be carried out through a transparent substrate, in which case a suitable layer sequence is the following: substrate, absorber layer and, if necessary, reflector.

The light-reflecting layer should be such that the light used for recording and for scanning is very quantitatively reflected by this layer. Examples of suitable light-reflecting materials are aluminum, rhodium, gold, tin, lead, bismuth, copper and dielectric mirrors. The thickness of the light-reflecting layer should be sufficiently large for the light used for recording or for scanning to be reflected as completely as possible by this layer.

Mirrors having a low thermal conductivity are advantageous for this purpose. The base, or the light-reflecting layer, must have an optically smooth, flat surface, and the surface must be such that the absorbing layer adheres firmly to it. In order to exert an advantageous influence on the surface quality and adhesion phenomena, the base and/or the reflector may be provided with a subbing layer consisting of a duroplastic or thermoplastic material.

The novel layer which is sensitive to laser light is preferably applied by whirler-coating with the dissolved or dispersed dye in the presence of a binder. Other suitable methods of producing the layers are knife-coating and immersion. The film can be dried and hardened under reduced pressure and at elevated temperatures, or if necessary by means of radiation. Metallic reflector layers are preferably applied by vapor deposition under reduced pressure or by applying a suitable metal foil to the base.

To apply the absorption layers from solution, a solution or, if necessary, a dispersion of the dye or dye mixture and the polymer in a suitable solvent, such as methylene chloride, chloroform, carbon tetrachloride, acetone, methyl ethyl ketone, cyclohexanone, toluene, acetonitrile, ethyl acetate, methanol or a mixture of these, is prepared, and, if required, a binder is added.

Suitable binders are either radiation-curable or heat-curable resins, eg. photopolymers, silicone resins and epoxy resins or thermoplastics.

Thermoplastics which are non-crystalline or possess only very low crystallinity and have a glass transition temperature of $>35°$ C., in particular $>75°$ C., are preferred. Moreover, the plastics must be compatible with the dyes (I). Examples of suitable substances are water-insoluble binders having a high dissolving power for the dyes (I), eg. (meth)acrylate polymers and copolymers, polystyrene homopolymers and copolymers, polyvinylcarbazole, polyvinyl ester copolymers, polyvinyl chloride and cellulose esters. The heat generated when the laser light is absorbed results in the thermoplastic flowing radially outward and hence in the formation of holes with sharply defined edges, giving an excellent signal/noise ratio for the information.

Depending on the structure of the system, the dye-in-polymer layer is first applied and then the reflector, or vice versa. The application of intermediate and protective layers or of a reflecting layer can, if appropriate, be dispensed with.

Where the exposed dye-in-polymer layer does not possess sufficient mechanical stability, it can be covered with a transparent protective layer. This can be done with a number of polymers, which can be used to produce a protective layer by whirler coating, knife coating or immersion using a solution of the polymer or by vapor deposition under reduced pressure, in particular using fluorinated polymers.

When the data store is built up from two identical or different recording materials in the form of a sandwich, a protective layer can be dispensed with. Apart from greater mechanical and rotational dynamic stability, the sandwich structure has the advantage of affording twice the storage capacity.

When the optical recording material is of adequate quality, the protective and/or intermediate layers can be dispensed with. Where intermediate layers cannot be dispensed with, the thickness of these layers must be chosen so that no troublesome interference can occur, the refractive index of the material used for this purpose and the wavelength of the laser light employed being taken into account.

The Example which follows illustrates the invention.

EXAMPLE

Two 1.2 mm thick polymethyl methacrylate disks having a diameter of 120 mm and a central hole with a diameter of 15 mm are cleaned (removal of dust particles), and provided, under clean-room conditions, with a subbing layer about 0.3 μm thick and consisting of high molecular weight polymethyl methacrylate. A solution of 1 g of the dye (I.2) and 1 g of a 70:30 methacrylate/methacrylic acid copolymer in chloroform is applied onto the subbing layer on the disk by the whirler coating method at 4800 rpm. After drying, the dye-in-polymer layer is about 0.3 μm thick. A 0.03 μm thick aluminum mirror is applied on top of the dye layer in a vapor deposition apparatus under reduced pressure. A 1.2 μm thick protective layer is applied on top of the aluminum mirror by whirler coating using polystyrene in xylene.

The two disks are bonded together via suitable spacer rings to form a sandwich with the coated sides facing inward, so that an air gap of 0.4 mm remains. In the recording material, individual holes about 1 μm in size are written into the photosensitive layer using a tuned AlGaAs laser ($\lambda=820$ nm). This information in the form of holes can be read again by means of light from a semiconductor laser, the best sensitivity and a very good signal-to-noise ratio being achieved with laser light of wavelength $\lambda=780$ nm.

We claim:

1. An optical recording material consisting of a base and a dye-containing polymer layer, said polymer layer containing at least one triquinocyclopropane of the formula:

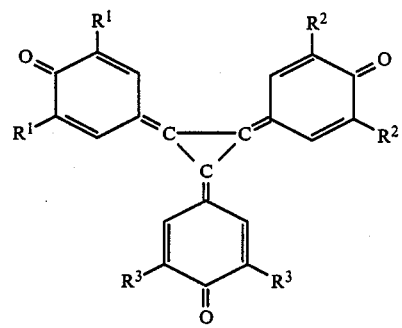

wherein $R^1$, $R^2$ and $R^3$ independently of one another are each straight-chain or branched $C_1$–$C_{12}$-alkyl.

2. The recording material as claimed in claim 1, wherein $R^1$, $R^2$, and $R^3$ independently of one another are each $C_1$–$C_4$-alkyl.

3. The recording material as claimed in claim 1, wherein $R^1$, $R^2$ and $R^3$ each independently is a member selected from the group consisting of methyl, ethyl, n- and isopropyl, n- and isobutyl, 2-butyl, t-butyl, amyl, n-hexyl, n-octyl, 2-ethylhexyl, decyl, nonyl and dodecyl.

4. The recording material as claimed in claim 3, wherein $R^1$, $R^2$ and $R^3$ independently of one another are each methyl, isopropyl or tetra-butyl.

5. The recording material as claimed in claim 3, wherein one or more of the radicals $R^1$, $R^2$ and $R^3$ are isopropyl or tetra-butyl.

6. The recording material as claimed in claim 3, wherein $R^1$, $R^2$ and $R^3$ are each i-propyl.

7. The recording material as claimed in claim 3, wherein $R^1$, $R^2$ and $R^3$ are each t-butyl.

8. The recording material as claimed in claim 3, wherein $R^1$ is methyl and $R^2$ and $R^3$ are each t-butyl.

9. The recording material as claimed in claim 3, wherein $R^1$ is i-propyl and $R^2$ and $R^3$ are each t-butyl.

10. The recording material as claimed in claim 3, wherein $R^1$ and $R^2$ are each i-propyl and $R^3$ is t-butyl.

11. The recording material as claimed in claim 1, wherein said dye-containing polymer layer, in addition to said triquinocyclopropane dye, contains at least one dye selected from the group consisting of substituted phthalocyanines, substituted dithiolene complexes, azo dyes, anthraquinone dyes, triphenylmethane dyes, methine dyes, quadratic acid derivatives and pyrylium and thiopyrylium salts.

* * * * *